(12) United States Patent
Sugimoto et al.

(10) Patent No.: US 8,783,462 B2
(45) Date of Patent: Jul. 22, 2014

(54) PACKAGING CONSTRUCTION

(75) Inventors: Shuji Sugimoto, Hyogo (JP); Ryoji Shigemoto, Osaka (JP); Kyosuke Miyata, Osaka (JP); Takeshi Fukuta, Nara (JP)

(73) Assignees: Panasonic Corporation, Osaka (JP); The Pack Corporation, Osaka (JP)

( * ) Notice: Subject to any disclaimer, the term of this patent is extended or adjusted under 35 U.S.C. 154(b) by 0 days.

(21) Appl. No.: 14/239,512

(22) PCT Filed: Aug. 28, 2012

(86) PCT No.: PCT/JP2012/005402
§ 371 (c)(1),
(2), (4) Date: Feb. 18, 2014

(87) PCT Pub. No.: WO2013/031194
PCT Pub. Date: Mar. 7, 2013

(65) Prior Publication Data
US 2014/0166532 A1 Jun. 19, 2014

(30) Foreign Application Priority Data
Aug. 31, 2011 (JP) ................. 2011-189807

(51) Int. Cl.
*B65D 85/00* (2006.01)
*B65D 73/00* (2006.01)
(52) U.S. Cl.
USPC .......................................... 206/703; 206/485
(58) Field of Classification Search
USPC ........ 206/701, 703, 705, 443, 446, 485, 521, 206/591, 592, 593, 594
See application file for complete search history.

(56) References Cited

U.S. PATENT DOCUMENTS 1,938,214 A * 12/1933 Boeye .......................... 206/705
3,734,279 A * 5/1973 Fisher, Jr. .................... 206/564
(Continued)

FOREIGN PATENT DOCUMENTS

| JP | 58-161872 U | 10/1983 |
| JP | 5-3119 U | 1/1993 |

(Continued)

OTHER PUBLICATIONS

International Search Report issued in International Application No. PCT/JP2012/005402 with Date of mailing Nov. 20, 2012, with English Translation.

*Primary Examiner* — Jacob K Ackun
(74) *Attorney, Agent, or Firm* — McDermott Will & Emery LLP (57) ABSTRACT

The present disclosure is directed to a packaging construction for columnar batteries. The packaging construction includes an accommodation case including a bottom plate, and side plates located on outer edges of the bottom plate; a first tray having first recesses into which one end portions of the batteries are fitted, placed immediately above the bottom plate, and fixed to the accommodation case; and a second tray having second recesses into which the other end portions of the batteries are fitted, and placed above the first tray. The batteries are held so as to be fitted to the first and second trays and such that each adjacent pair of the batteries are apart from each other. A portion of a bottom of each first recess facing a corner portion of the one end portion of a corresponding one of the fitted batteries protrudes outward to be apart from the corner portion.

11 Claims, 4 Drawing Sheets

(56) References Cited

U.S. PATENT DOCUMENTS

| | | | |
|---|---|---|---|
| 4,696,402 A * | 9/1987 | Harmon et al. | 229/120.011 |
| 5,180,052 A * | 1/1993 | Smith et al. | 206/560 |
| 5,358,101 A * | 10/1994 | Lombardi | 206/776 |
| 7,422,113 B2 * | 9/2008 | Wakuda et al. | 206/705 |
| 7,494,014 B2 * | 2/2009 | Martinez | 206/705 |
| 7,597,199 B1 * | 10/2009 | Rochelo | 206/703 |
| 2003/0034274 A1 | 2/2003 | Morita et al. | |
| 2004/0214052 A1 * | 10/2004 | Rochelo | 429/9 |
| 2010/0330404 A1 | 12/2010 | Nishino et al. | |

FOREIGN PATENT DOCUMENTS

| | | |
|---|---|---|
| JP | 2001-338628 A | 12/2001 |
| JP | 2002-075308 A | 3/2002 |
| JP | 2009-193691 A | 8/2009 |

* cited by examiner

PACKAGING CONSTRUCTION

RELATED APPLICATIONS

This application is a national phase application of the U.S. National Phase under 35 U.S.C. §371 of International Application No. PCT/JP2012/005402, filed on Aug. 28, 2012, which in turn claims the benefit of Japanese Application No. 2011-189807, filed on Aug. 31, 2011, the disclosures of which Applications are incorporated by reference herein.

TECHNICAL FIELD

The present disclosure relates to packaging constructions, and more particularly to a packaging construction configured to package a plurality of columnar batteries.

BACKGROUND ART

Batteries have been widely used as power sources of various electronic devices. Examples of battery types include primary batteries typified by dry batteries, and secondary batteries that can be repeatedly charged and discharged. While examples of the shape of each of these batteries include various shapes, such as a cylindrical shape, a prismatic shape, and a sheet-like shape, columnar batteries are most common.

In recent years, there have been increasing demands for, for example, reusable nickel-hydrogen secondary batteries, reusable nickel-cadmium secondary batteries, and reusable lithium ion secondary batteries to save resources and energy. Among them, lithium ion secondary batteries are characterized by lightness in weight, high electromotive force, and high energy density. Thus, there are growing demands for the lithium ion secondary batteries as power sources for driving various kinds of mobile electronic devices and portable communication devices such as mobile phones, digital cameras, video cameras, and laptop personal computers. While lithium ion secondary batteries have various shapes, a large amount of standardized cylindrical batteries are produced, and examples of the standardized cylindrical batteries include 18650-sized batteries, 17670-sized batteries, 18500-sized batteries, 17500-sized batteries, 16340-sized batteries, and 14500-sized batteries.

Since lithium ion secondary batteries have high energy density, shorting causes the generation of a large amount of heat. Thus, processes for transporting lithium ion secondary batteries are strictly controlled, and in order to prevent an adjacent pair of batteries from being in contact with each other and thus being shorted to each other, the batteries have been packaged so as to be reliably spaced apart from one another, or so as to be each enclosed with insulating material (e.g., PATENT DOCUMENTS 1 and 2).

CITATION LIST

Patent Documents

PATENT DOCUMENT 1: Japanese Unexamined Patent Publication No. 2009-193691
PATENT DOCUMENT 2: Japanese Unexamined Patent Publication No. 2002-75308
PATENT DOCUMENT 3: Japanese Unexamined Utility Model Publication No. S58-161872

SUMMARY OF THE INVENTION

Technical Problem

In a technique described in PATENT DOCUMENT 1, partition members each having a height that is higher than half of the battery height is placed in a closed-end accommodation member, and batteries are placed in individual spaces into which the interior of the accommodation member is partitioned with the partition members. Such a structure requires that the batteries be fixed with the partition members to prevent the batteries from rattling during transportation of the batteries. Since the partition members, therefore, need to be placed to be in close contact with the batteries, and it requires force to insert the batteries into the individual spaces into which the interior of the accommodation member is partitioned with the partition members, it takes time to package the batteries. Furthermore, it similarly takes time to remove the batteries. Many partition members are required, and the cost of package materials, therefore, increases.

In a technique described in PATENT DOCUMENT 2, five bundles each including three ICR18650-sized lithium ion secondary batteries connected in series are connected in parallel, and are connected to a Safety Unit substrate to form a battery assembly. The battery assembly is packaged with a polyethylene bag and a packaging pad made of corrugated cardboard to form a packaging pack. Furthermore, a plurality of packaging packs are placed one over another, and are then packaged in a corrugated cardboard box. Thus, it requires effort and a long time to package them, and many Safety Unit substrates and many polyethylene bags, and many packaging pads made of corrugated cardboard are required, thereby increasing the package cost and increasing the package weight.

It is therefore an object of the present disclosure to provide a packaging construction in which a plurality of columnar batteries can be packaged in a short time at low cost, from which the batteries can be removed in a short time, and in which the batteries can be kept clean.

Solution to the Problem

A packaging construction of the present disclosure is a packaging construction for packaging a plurality of columnar batteries. The packaging construction includes: an accommodation case including a bottom plate, and side plates located on outer edges of the bottom plate; a first tray placed immediately above the bottom plate and fixed to the accommodation case; and a second tray placed above the first tray. The first tray has a plurality of first recesses into which one end portions of the columnar batteries are fitted, and is fixed to the accommodation case such that bottoms of portions of the first tray corresponding to the first recesses face the bottom plate, the second tray has a plurality of second recesses into which the other end portions of the columnar batteries are fitted, the columnar batteries are held such that the one end portions of the columnar batteries are fitted into the first recesses of the first tray, the other end portions of the columnar batteries are fitted into the second recesses of the second tray, and each adjacent pair of the columnar batteries are apart from each other, and a portion of a bottom of each first recess faces a corner portion of the one end portion of a corresponding one of the fitted columnar batteries, and protrudes outward to be apart from the corner portion. In other words, the packaging construction of the present disclosure is a packaging construction in which a plurality of batteries are held so as to be interposed between two trays while being apart from one another, and are packaged. The one end portions denote upper or lower end portions of the columnar batteries.

In an embodiment, a depth of each first recess may be greater than or equal to 5% of a height of each columnar battery and equal to or less than 50% of the height of the columnar battery.

In an embodiment, the packaging construction may further include: a retaining member placed on the second tray.

In an embodiment, one of electrode terminals of each columnar battery may include a protrusion, and the first or second recesses into which the end portions of the columnar batteries each including the one of the electrode terminals are fitted may each include an indentation that keeps a surface of the first or second recess apart from the one of the electrode terminals when a corresponding one of the end portions has been fitted into the first or second recess.

In an embodiment, each first recess may be tapered so as to be narrowed from an opening to a bottom of the first recess. A taper angle of each tapered first recess is preferably greater than or equal to one degree and equal to or less than 20 degrees.

In an embodiment, each second recess may be tapered so as to be narrowed from an opening to a bottom of the second recess. A taper angle of each tapered second recess is preferably greater than or equal to one degree and equal to or less than 20 degrees.

In an embodiment, a distance between the first and second trays may be greater than or equal to 30% of a height of each columnar battery and equal to or less than 90% of the height of the columnar battery. The distance between the first and second trays is the distance from the opening edge of each first recess to the opening edge of a corresponding one of the second recesses.

In an embodiment, the accommodation case may be in the form of a rectangular box, and may be made of corrugated cardboard, and a core of the corrugated cardboard may have flutes extending obliquely to edges of a corresponding one of rectangles forming the accommodation case.

In an embodiment, the first and second trays may be made of plastic containing an anticorrosive.

Advantages of the Invention

The batteries are held such that one end portions of the batteries are fitted into the first recesses of the first tray, the other end portions thereof are fitted into the second recesses of the second tray, and each adjacent pair of the batteries are apart from each other, and a portion of a bottom of each first recess faces a corner portion of the one end portion of a corresponding one of the fitted batteries, and protrudes outward to be apart from the corner portion. Thus, the batteries are easily packaged, the insertion of the batteries between the first tray and the second tray can ensure the prevention of contact between each adjacent pair of the batteries, and the corner portion of each battery can be prevented from scraping off the first tray and thus forming flakes.

DESCRIPTION OF EMBODIMENTS

Before description of embodiments of the present disclosure, the reason for which the inventors of this application arrived at the present invention will be described hereinafter.

PATENT DOCUMENT 3 describes a shock absorber for packaging dry batteries. The shock absorber corresponds to a technique before development of lithium ion secondary batteries. Dry batteries have a battery voltage less than half of the battery voltage of lithium ion secondary batteries, and the technique described in PATENT DOCUMENT 3 is an about 30-year-old packaging technique. Thus, it was found that when the shock absorber for packaging is used without being changed to package lithium ion secondary batteries, various problems occur. In particular, a significant problem emerged where when a battery removed from the shock absorber is placed in a power supply pack, and an electrode terminal of the battery is welded to a terminal of the power supply pack, this causes poor contact between welded portions of the terminals. The inventors of this application investigated these problems, and studied various solutions to the problems to arrive at the present invention.

Embodiments of the present disclosure will be described in detail hereinafter with reference to the drawings. In the drawings, like reference characters have been used to designate identical or equivalent elements for simplicity of description.

First Embodiment

A packaging construction according to a first embodiment is configured to package a plurality of 18650-sized cylindrical lithium ion secondary batteries (diameter: 18 mm, height: 65 mm). The batteries are cylindrical, and each have one end portion including a negative electrode, and the other end portion including a positive electrode. The positive electrode has a circular end surface having a protruding central portion.

Figure 1:
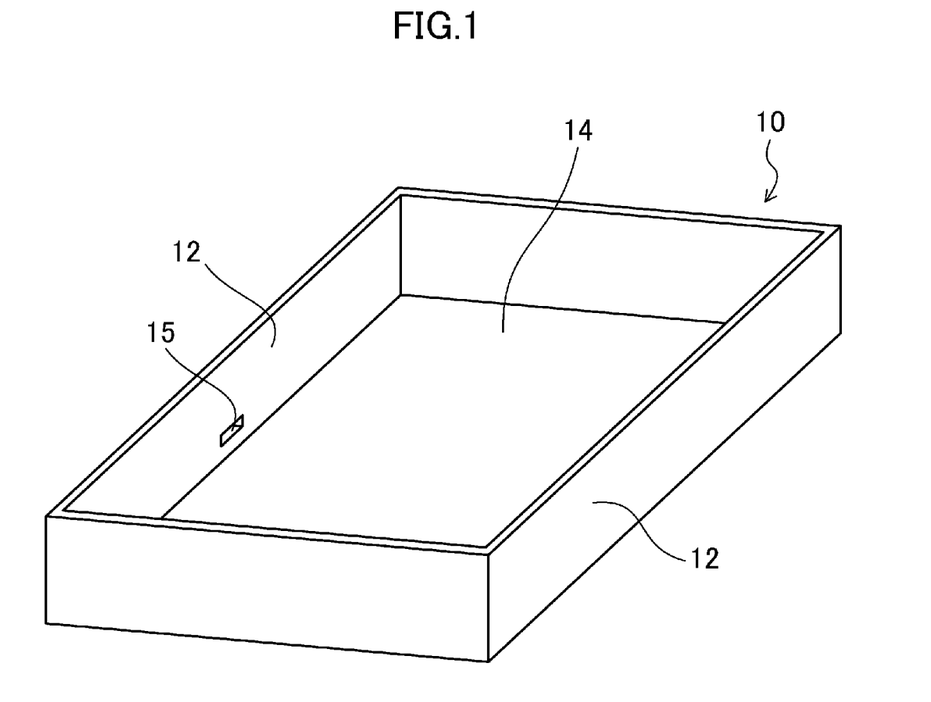
FIG. 1 is a perspective view of an accommodation case according to an embodiment.

FIG. 1 illustrates an accommodation case for use in this embodiment. The accommodation case 10 is made of corrugated cardboard, and includes a rectangular bottom plate 14, and four side plates 12 placed on the outer edges of the bottom plate 14 perpendicularly to the bottom plate 14. In other words, the accommodation case 10 is a box-like case that does not have a lid, and a portion of each of a parallel pair of the side plates 12 near the bottom plate 14 has a groove 15. The height of each of the side plates 12 from the bottom plate 14 is substantially equal to that of each of the batteries.

A core of the corrugated cardboard forming the accommodation case 10 has flutes extending obliquely to the edges of each of the bottom plate 14 and the side plates 12. Thus, when the packaging construction that has packaged the batteries is dropped, the strengths of the side surfaces of the accommodation case 10 against impact are substantially equal independently of on which of the side surfaces of the accommodation case 10 the drop impact first occurs, and thus the accommodation case 10 does not have any side surface that is especially vulnerable to a drop.

Figure 2:
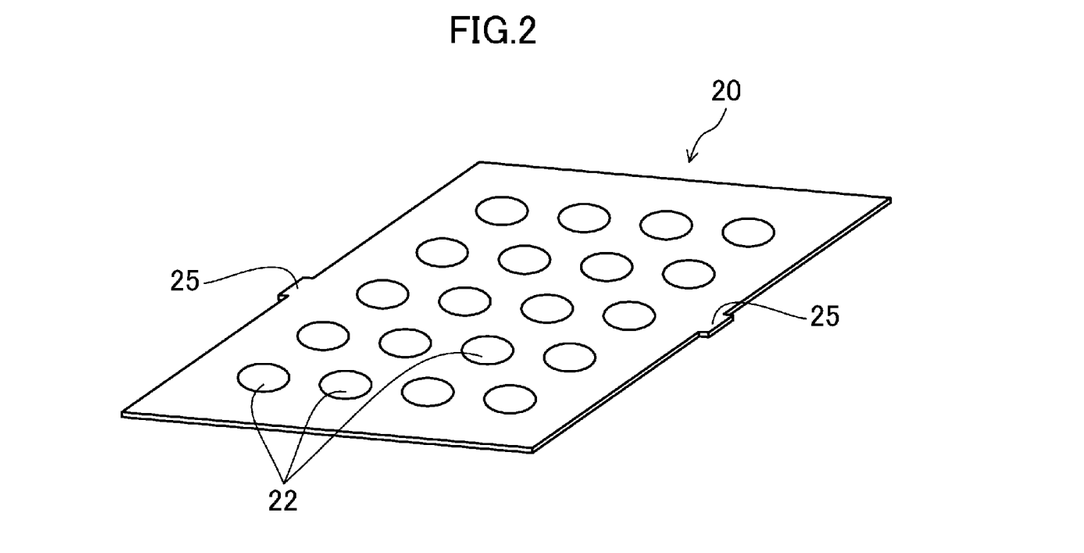
FIG. 2 is a perspective view of a first tray according to the embodiment.

FIG. 2 illustrates a first tray for use in this embodiment. The first tray 20 is a rectangular polypropylene plate including first recesses 22, 22, . . . that are many indentations. The first tray 20 is placed on the bottom plate 14 of the accommodation case 10, includes two nail portions 25, 25 protruding from sides of the first tray 20 and fitted into the grooves 15 of the accommodation case 10, and thus, is fixed to the accommodation case 10. The first tray 20 is placed in the accommodation case 10 such that the bottoms of portions of the first tray 20 corresponding to the first recesses 22, 22, . . . face the bottom plate 14 of the accommodation case 10. The first tray 20 is fabricated by vacuum forming using a polypropylene sheet into which an anticorrosive is kneaded as a material of the first tray 20.

Figure 3:
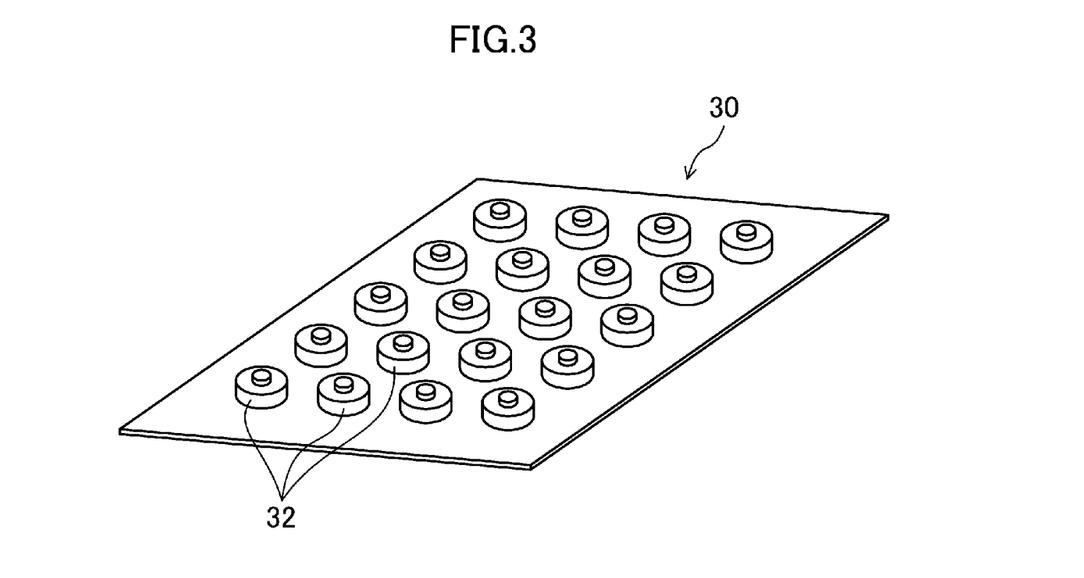
FIG. 3 is a perspective view of a second tray according to the embodiment.

FIG. 3 illustrates a second tray for use in this embodiment. The second tray 30 is also a rectangular polypropylene plate including second recesses 32, 32, . . . that are many indentations similarly to the first tray 20. As described below, after one end portions of a plurality of batteries have been fitted to the first tray 20, the second tray 30 is placed above the first tray 20, and then, the other end portions of the batteries are fitted into the second recesses 32, 32, . . . . The second tray 30 is also fabricated by vacuum forming using a polypropylene sheet into which an anticorrosive is kneaded as a material of the second tray 30 similarly to the first tray 20.

Figure 4:
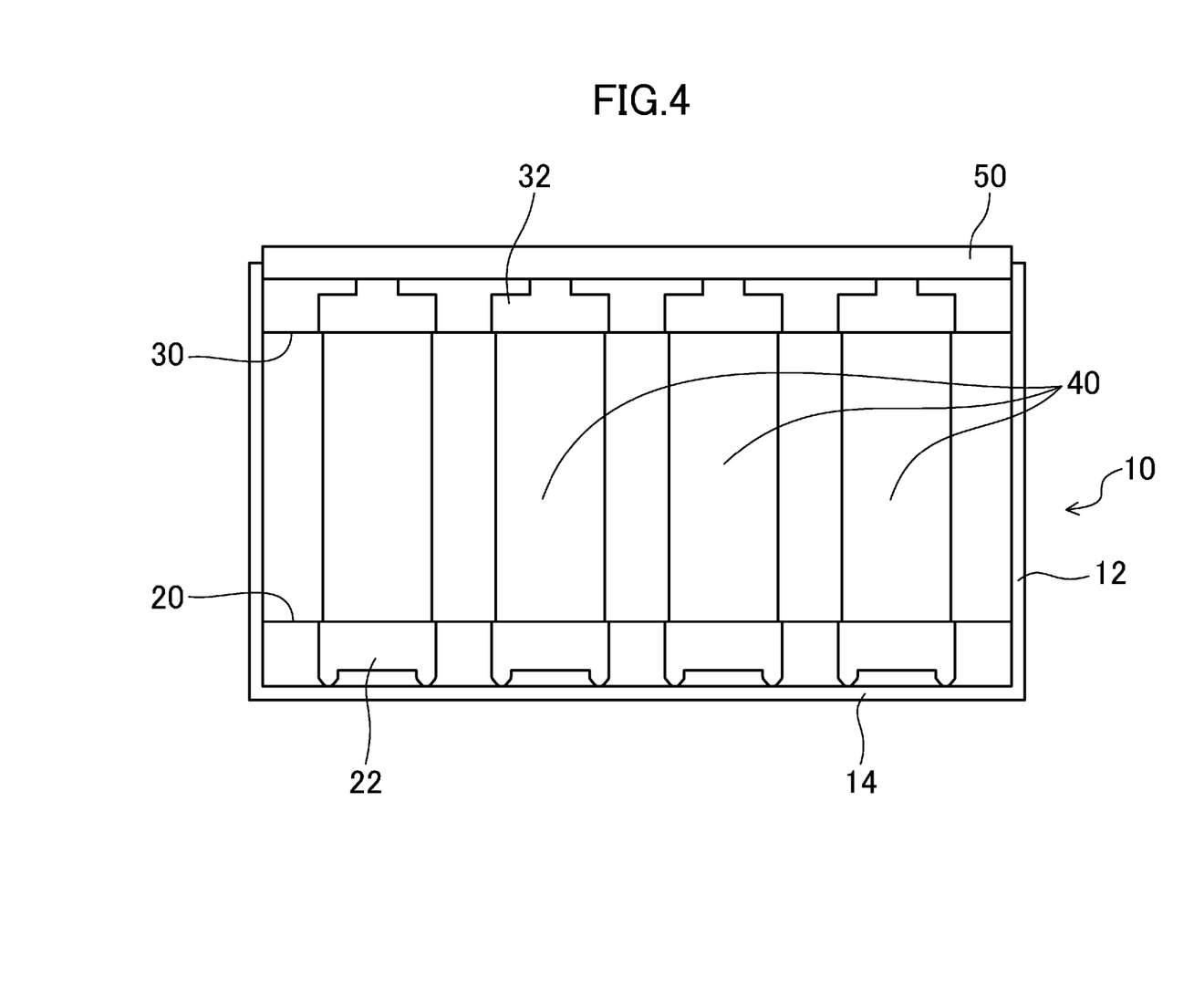
FIG. 4 is a schematic view illustrating the interior of a packaging construction according to the embodiment.

FIG. 4 illustrates the packaging construction of this embodiment, where one of the side plates 12 of the accommodation case 10 is removed such that the interior of the packaging construction is visible. One end portions (near negative electrodes) of a plurality of batteries 40, 40, . . . are fitted into the first recesses 22, 22, . . . of the first tray 20 placed and fixed in the accommodation case 10. This allows each adjacent pair of the batteries 40, 40, . . . to be apart from each other (allows the side surfaces of the batteries 40, 40, . . . to be some distance apart from one another).

The other end portions (near positive electrodes) of the batteries 40, 40, . . . that are upper end portions thereof are fitted into the second recesses 32, 32, . . . of the second tray 30. As such, both the end portions of each of the batteries 40 are fitted into a corresponding one of the first recesses 22 and a corresponding one of the second recesses 32, and the battery 40 is, thus, fixed and held by the first tray 20 and the second tray 30. In the foregoing manner, the batteries 40, 40, . . . are fixed and held such that each adjacent pair of the batteries 40 are apart from each other. Then, a retaining member 50 made of corrugated cardboard is placed on the second tray 30 to retain the second tray 30. The retaining member 50 is fixed to the accommodation case 10, thereby allowing the second tray 30 to be also fixed to the accommodation case 10.

In this embodiment, packaging starts with the accommodation case 10 prepared. The first tray 20 is placed in the accommodation case 10 so as to be fixed. The first tray 20 is placed such that the bottoms of portions of the first tray 20 corresponding to the first recesses 22 face the bottom plate 14 of the accommodation case 10, and is fixed to the accommodation case 10 by inserting the nail portions 25 into the grooves 15.

Then, the one end portions (near the negative electrodes) of the batteries 40, 40, . . . are fitted into the first recesses 22, 22, . . . of the first tray 20. The batteries 40 are each fitted into a corresponding one of the first recesses 22 so as to be held in an upright position.

After all of the batteries 40, 40, . . . have been fitted thereinto, the second tray 30 is placed on the other end portions (near the positive electrodes) of the batteries 40, 40, . . . , and the end portions thereof near the positive electrodes are fitted into the second recesses 32, 32, . . . . This allows the batteries 40 to be held such that each adjacent pair of the batteries 40 are apart from each other.

Then, the retaining member 50 is placed on the second tray 30, and the retaining member 50 and the accommodation case 10 are fixed.

Here, the depth of each of the first recesses 22 is preferably greater than or equal to 5% of the height of each of the batteries 40 and equal to or less than 50% thereof, and is more preferably greater than or equal to 10% of the height of each of the batteries 40 and equal to or less than 30% thereof.

When the depth of each of the first recesses 22 is less than 5% of the height of each of the batteries 40, the batteries 40 that have been fitted into the first recesses 22 may be unable to be kept in an upright position, and when the second tray 30 is to be placed on the batteries 40, upper end portions of the batteries 40 may be unable to be fitted into the second recesses 32. The depth of each of the first recesses 22 is more preferably greater than or equal to 10% of the height of each of the batteries 40, because this can ensure that the batteries 40 are kept in an upright position while being fitted into the first recesses 22.

When the depth of each of the first recesses 22 exceeds 50% of the height of each of the batteries 40, it may take too much time to fit the batteries 40 into the first recesses 22, and conversely, it may require excessive time and effort to remove the batteries 40 from the first recesses 22. Furthermore, when, for example, lot numbers are printed on the side surface of each of the batteries 40, and the depth of each of the first recesses 22 is great, a printed portion of the battery 40 and the surface of a corresponding one of the first recesses 22 may rub against each other, and consequently, printed information may be unable to be read. When the depth of each of the first recesses 22 is equal to or less than 30% of the height of the battery 40, the batteries 40 can be easily inserted into the first recesses 22 and be easily removed therefrom.

The distance between the first tray 20 and the second tray 30 is greater than or equal to 30% of the height of each of the batteries 40 and equal to or less than 90% thereof. When the distance is less than 30% of the height of the battery 40, it may take time to remove the packaged batteries 40. When the distance exceeds 90% of the height of each of the batteries 40, the battery 40 cannot be held under vibrations or impact during packaging, and each adjacent pair of the batteries 40 may be in contact with each other.

The shortest distance between each adjacent pair of the batteries 40 is preferably greater than or equal to 5% of the diameter of each of the batteries 40 and equal to or less than 50% thereof. When the shortest distance therebetween is less than 5% of the diameter, each adjacent pair of the batteries 40 may be in contact with each other due to vibrations or impact. When the shortest distance therebetween exceeds 50% of the diameter, the density at which the batteries are packaged decreases, resulting in increased package cost and increased transportation cost.

Figure 5:
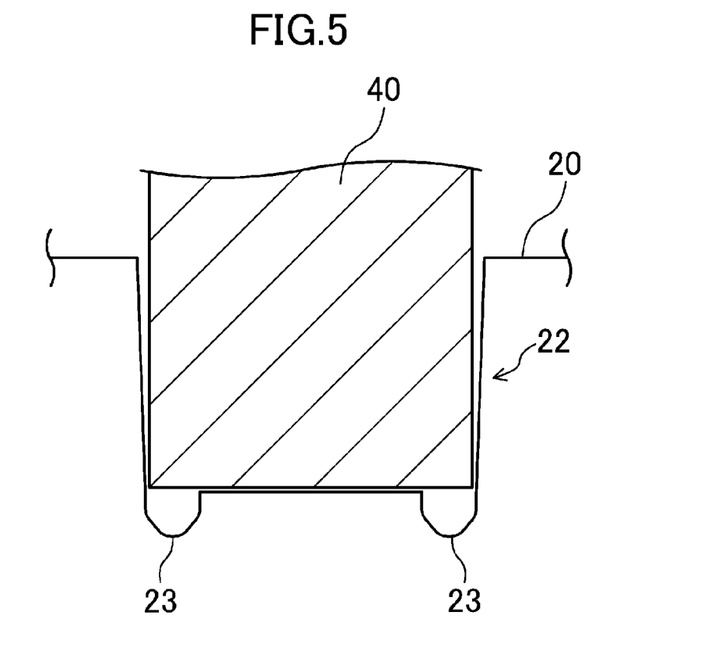
FIG. 5 is an enlarged cross-sectional view of a region surrounding a first recess.

Next, FIG. 5 is an enlarged cross-sectional view of one of the first recesses 22. The first recesses 22 are tapered such that a bottom (circular) portion of each of the first recesses 22 has a slightly larger diameter than a corresponding one of the batteries 40, and the diameter of the first recess 22 increases from the bottom surface thereof to an opening thereof. Conversely, the first recess 22 is narrowed from the opening to the bottom surface. Such a tapered shape facilitates fitting the batteries 40 into the first recesses 22, and facilitates removing the batteries 40 from the first recesses 22.

The taper angle of this tapered shape is preferably greater than or equal to one degree and equal to or less than 20 degrees. When the taper angle is less than one degree, this makes it difficult to fit each of the batteries 40 into a corresponding one of the first recesses 22, and to remove the battery 40 from the corresponding one of the first recesses 22, and therefore, the operating time may increase. When the taper angle exceeds 20 degrees, the batteries 40 may be unable to be reliably held. Thus, the packaged batteries 40 may rattle, and each adjacent pair of the batteries 40 may be in contact with each other under an impact.

Figure 6:
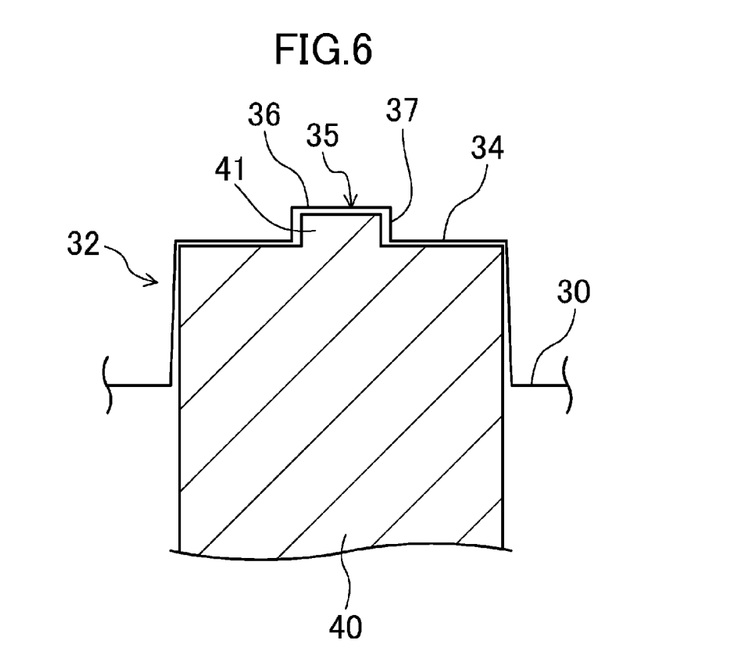
FIG. 6 is an enlarged cross-sectional view of a region surrounding a second recess.

The second recesses 32 are also tapered similarly to the first recesses 22. The taper angle of the tapered shape of each of the second recesses 32 is also preferably greater than or equal to one degree and equal to or less than 20 degrees similarly to that of each of the first recesses 22. Such a tapered shape facilitates lifting off the second tray 30 fitted to the batteries 40.

An outer portion of the bottom surface of each of the first recesses 22 includes an indentation 23 protruding outward (downward) or further recessed below the first recess 22. Thus, when each of the batteries 40 is fitted into a corresponding one of the first recesses 22, the outer portion of the bottom surface of the corresponding one of the first recesses 22 is apart from a corner portion of the battery 40, and thus, is not in contact with the corner portion. When this indentation 23 is not provided, and the packaged batteries 40 are transported, a corner portion of each of the batteries 40 rubs against an outer portion of the bottom surface of a corresponding one of the first recesses 22 and its surroundings due to vibrations during transportation, thereby scraping off part of the first tray 20. The resultant flakes may be attached to an electrode of the battery 40 (a negative electrode near the bottom surface of the corresponding one of the first recess 22), and may cause poor contact in use of the battery 40. When, similarly to this embodiment, the indentation 23 is provided, the indentation 23 significantly reduces flakes during transportation, and poor contact of the battery 40 is hardly caused. Specifically, terminal portions of the battery 40 is always kept clean while being held in the packaging construction of this embodiment. This is a big difference between the technique described in PATENT DOCUMENT 3 and this embodiment. In particular, in PATENT DOCUMENT 3, used paper or another material is converted into a solution to form, with a vacuum former, shock absorbing members between which batteries are interposed to fix the batteries, and thus, fibers of the paper tend to be easily adhered to the batteries.

Next, FIG. 6 is an enlarged cross-sectional view of one of the second recesses 32. Similarly to the first recesses 22, the second recesses 32 are also tapered such that the diameter of each of the first recesses 22 increases from the bottom surface thereof to an opening thereof. This can facilitate fitting the second tray 30 to the battery 40, and facilitate removing the second tray 30.

A central portion of the bottom surface of each of the second recesses 32 includes a terminal indentation 35 corresponding to a positive electrode terminal 41 protruding from an end portion of a corresponding one of the batteries 40 near the positive electrode thereof. A side portion 37 and a bottom portion 36 of the terminal indentation 35 are formed so as to be able to be kept out of contact with the positive electrode terminal 41. Specifically, the depth of the terminal indentation 35 is greater than the height of the positive electrode terminal 41, and the diameter of the terminal indentation 35 is greater than that of the positive electrode terminal 41. Thus, when an outer portion 34 of the bottom surface of the second recess 32 is in contact with an outer portion of an upper surface of the corresponding one of the batteries 40 near the positive electrode thereof, the positive electrode terminal 41 is not in contact with the second tray 30, and flakes of the second tray 30 are not adhered to the positive electrode terminal 41 even under vibrations during transportation. Thus, when the batteries 40 are each used as a power source for, for example, an electronic device, poor contact and an electrical continuity failure both arising from flakes can be prevented.

In the packaging construction of this embodiment, the columnar batteries 40 are vertically interposed between the trays so as to be fixed. This eliminates the need for inserting a member configured to prevent contact between each adjacent pair of the batteries 40 into the gap therebetween, thereby reducing the cost for the member. Furthermore, electrode portions of each of the batteries can be kept clean during transportation. Since the partition member described in PATENT DOCUMENT 1 is not used, this allows the batteries 40 to be easily fitted into the first recesses 22 of the first tray 20, and can facilitate automation and mechanization. Although, in the packaging construction of this embodiment, the number of types of package materials and the amount of the package materials are less than those in each of the packaging constructions of PATENT DOCUMENTS 1 and 2, the packaging construction of this embodiment can ensure that the batteries 40, 40, . . . are held so as not to be in contact with one another, and enables safe transportation at low package cost. Furthermore, the batteries 40, 40, . . . can be easily unpacked. The first tray 20 and the second tray 30 both made of a synthetic resin into which an anticorrosive is kneaded can prevent the batteries 40 from rusting during storage and transportation of the batteries 40.

Other Embodiments

The foregoing embodiment is merely an example of the present invention, and the present invention is not limited to the above embodiment. The embodiment may be combined with well-known techniques, conventional techniques, and/or publicly known techniques, and may be partially replaced therewith. Modifications at which those skilled in the art would readily arrive may be included in the present invention. For example, the type and number of batteries packaged in a single packaging construction are not specifically limited, and the material and shape of the accommodation case are also not specifically limited.

Packaged batteries are preferably, but not limited to, lithium ion secondary batteries, may be any type of batteries, and may have any columnar shape, such as a cylindrical shape or a prismatic shape. The batteries may have a side surface including an insulative exterior tube, or may have a side surface that does not include an exterior tube. Even in the absence of the exterior tube, contact between each adjacent pair of the batteries is reliably prevented to enable safe storage and safe transportation.

The accommodation case does not need to include all of the four side plates. At least a pair of parallel side plates are required. As long as sides of the accommodation case that do not include side plates are covered with, for example, a shock absorber or an outer case, the batteries are protected.

The first tray and the second tray may be made of plastic except polypropylene, or may be made of other materials, such as paper or a metal. However, when paper is used, paper powder is highly likely to be formed, and when a metal is used, it requires time and effort to ensure the insulation performance of the metal. Thus, plastic is more preferable than paper or a metal. A composite material, such as a material including a plastic film laminated on the surface of a metal sheet, may be used.

The packaged batteries may be arranged such that their positive electrodes face toward the bottom plate of the accommodation case. Alternatively, all of the batteries do not need to be arranged such that only one of electrodes of each of the batteries faces toward the bottom plate of the accommodation case. Specifically, some of the batteries may be arranged such that their positive electrodes face toward the bottom plate, and the other ones thereof may be arranged such that their negative electrodes face toward the bottom plate.

A portion of the first tray is marked, and the location of each of the batteries can be identified based on the marked portion. This enables identification of each of the packaged batteries. Thus, if the battery characteristics of each of the batteries are recorded on the battery before packaging, a required one of the packaged batteries having specific battery characteristics is immediately found, and the required battery can be taken out. For example, the battery characteristics of each of the packaged batteries may be described on the outer surface of a package. The first tray may be marked by any means, such as by printing, by cutting away a portion of the tray, or by changing the shape of a portion of the tray (for example, forming a protrusion on the tray). Alternatively, the second tray may be marked.

The first tray or the second tray may include, for example, a protrusion. Thus, even when a plurality of trays are placed one above another, such a protrusion, for example, allows a gap to be formed between each vertically adjacent pair of the trays, thereby easily removing one of the trays.

The first and second trays may have the same shape. The first and second trays may be, for example, trays each having recesses each including both an indentation in an outer portion of the bottom surface of the recess and an indentation for a positive electrode terminal. This allows the trays to be of one type, and thus, can reduce the package cost.

The batteries may be arranged in a hexagonal grid pattern or in a rectangular grid pattern except in such a square grid pattern as in the embodiment.

The accommodation case may be further packaged with an outer case. In this case, the retaining member may be a portion of the outer case. When the outer case is made of corrugated cardboard, a core of the corrugated cardboard preferably has flutes extending obliquely to the edges of each of the bottom plate and the side plates similarly to the accommodation case, because the outer case exhibits substantially the same resistance to a drop after packaging independently of on which of the surfaces of the outer case the drop impact first occurs.

The number of nail portions of the first tray and the number of corresponding grooves in the side plates of the accommodation case are not limited to two in the first embodiment. When two opposite sides of the first tray each include a plurality of nail portions, the first tray is more securely fixed to the accommodation case. All of the four sides of the first tray may each include a nail portion, and the four side plates of the accommodation case may each have a groove.

INDUSTRIAL APPLICABILITY

As described above, the packaging construction of the present disclosure has a simple structure while being able to hold a plurality of batteries such that the batteries are not in contact with one another. Thus, the present disclosure is useful as, for example, packaging constructions for storing and transporting secondary batteries.

DESCRIPTION OF REFERENCE CHARACTERS

| | |
|---|---|
| 10 | ACCOMMODATION CASE |
| 12 | SIDE PLATE |
| 14 | BOTTOM PLATE |
| 20 | FIRST TRAY |
| 22 | FIRST RECESS |
| 30 | SECOND TRAY |
| 32 | SECOND RECESS |
| 40 | BATTERY |
| 50 | RETAINING MEMBER |

The invention claimed is:

1. A packaging construction for packaging a plurality of columnar batteries, the packaging construction comprising:
    an accommodation case including
        a bottom plate, and
        side plates located on outer edges of the bottom plate;
    a first tray placed immediately above the bottom plate and fixed to the accommodation case; and
    a second tray placed above the first tray, wherein
    the first tray has a plurality of first recesses into which one end portions of the columnar batteries are fitted, and is fixed to the accommodation case such that bottoms of portions of the first tray corresponding to the first recesses face the bottom plate,
    the second tray has a plurality of second recesses into which the other end portions of the columnar batteries are fitted,
    the columnar batteries are held such that the one end portions of the columnar batteries are fitted into the first recesses of the first tray, the other end portions of the columnar batteries are fitted into the second recesses of the second tray, and each adjacent pair of the columnar batteries are apart from each other, and
    a portion of a bottom of each first recess facing a corner portion of the one end portion of a corresponding one of the fitted columnar batteries protrudes outward to be apart from the corner portion.

2. The packaging construction of claim 1, wherein
    a depth of each first recess is greater than or equal to 5% of a height of each columnar battery and equal to or less than 50% of the height of the columnar battery.

3. The packaging construction of claim 1, further comprising:
    a retaining member placed on the second tray.

4. The packaging construction of claim 1, wherein
    one of electrode terminals of each columnar battery includes a protrusion, and
    the first or second recesses into which the end portions of the columnar batteries each including the one of the electrode terminals are fitted each include an indentation that keeps a surface of the first or second recess apart from the one of the electrode terminals when a corresponding one of the end portions has been fitted into the first or second recess.

5. The packaging construction of claim 1, wherein
    each first recess is tapered so as to be narrowed from an opening to a bottom of the first recess.

6. The packaging construction of claim 5, wherein
    a taper angle of each tapered first recess is greater than or equal to one degree and equal to or less than 20 degrees.

7. The packaging construction of claim 1, wherein
    each second recess is tapered so as to be narrowed from an opening to a bottom of the second recess.

8. The packaging construction of claim 7, wherein
    a taper angle of each tapered second recess is greater than or equal to one degree and equal to or less than 20 degrees.

9. The packaging construction of claim 1, wherein
    a distance between the first and second trays is greater than or equal to 30% of a height of each columnar battery and equal to or less than 90% of the height of the columnar battery.

10. The packaging construction of claim 1, wherein
    the accommodation case is in the form of a rectangular box, and is made of corrugated cardboard, and a core of the corrugated cardboard has flutes extending obliquely to edges of a corresponding one of rectangles forming the accommodation case.

11. The packaging construction of claim 1, wherein the first and second trays are made of plastic containing an anticorrosive.

* * * * *